US006977673B1

(12) United States Patent
McKain et al.

(10) Patent No.: US 6,977,673 B1
(45) Date of Patent: Dec. 20, 2005

(54) PORTABLE MOVING PICTURE RECORDING DEVICE INCLUDING SWITCHING CONTROL FOR MULTIPLE DATA FLOW CONFIGURATIONS

(75) Inventors: James A. McKain, Andover, MA (US); Peter Fasciano, Natick, MA (US); Jeffrey D. Kurtze, Nashua, NH (US); Stephen M. DiSciullo, Danvers, MA (US); Paul H. Greaves, Tyngsboro, MA (US); Harry Der, Westford, MA (US); Morton Tarr, Bolton, MA (US)

(73) Assignee: Avid Technology, Inc., Tewksbury, MA (US)

(*) Notice: Subject to any disclaimer, the term of this patent is extended or adjusted under 35 U.S.C. 154(b) by 0 days.

(21) Appl. No.: 08/932,993

(22) Filed: Sep. 18, 1997

Related U.S. Application Data

(63) Continuation of application No. 08/816,068, filed on Mar. 11, 1997, now abandoned, and a continuation of application No. 08/702,152, filed on Aug. 23, 1996, now abandoned, and a continuation of application No. 08/606,429, filed on Feb. 23, 1996, now abandoned, which is a continuation of application No. 08/418,186, filed on Apr. 7, 1995, now abandoned, which is a continuation of application No. 08/392,536, filed on Feb. 23, 1995, now abandoned.

(51) Int. Cl.[7] ............... H04N 5/225; H04N 5/228; H04N 5/76
(52) U.S. Cl. ............... 348/207.99; 348/222.1; 348/231.4; 386/117
(58) Field of Search .................. 348/207, 231, 348/232, 233, 552, 722, 207.99, 231.2, 231.3, 231.7, 231.9, 14.01, 222.1, 705; 345/328; 358/906, 909.1; 386/117

(56) References Cited

U.S. PATENT DOCUMENTS

| 2,927,154 A | 3/1960 | Wolfe | 178/6.6 |
|---|---|---|---|
| 3,594,513 A | 7/1971 | Greenberg | |
| 3,617,626 A | * 11/1971 | Bluth | 386/4 |
| 3,875,329 A | 4/1975 | Nagel | 178/6.8 |
| 4,061,228 A | 12/1977 | Johnson | 206/454 |

(Continued)

FOREIGN PATENT DOCUMENTS

| DE | 4304506 A1 | 8/1993 | |
|---|---|---|---|
| EP | 0210497 | 2/1987 | G11B/33/14 |
| EP | 0438299 A2 | 7/1991 | G11B/27/034 |
| EP | 0469850 A2 | 2/1992 | G11B/27/034 |
| EP | 0473322 A1 | 4/1992 | H04N/3/36 |

(Continued)

OTHER PUBLICATIONS

U.S. Appl. No. 08/932,784, filed Sep. 18, 1997, McKain et al., with Final Office Action dated May 8, 2002; Applicant's Amendment dated Dec. 17, 2002; and Applicant's Reply Brief Dated May 13, 2003.

(Continued)

*Primary Examiner*—Ngoc-Yen Vu
*Assistant Examiner*—Luong Nguyen
(74) *Attorney, Agent, or Firm*—Peter J. Gordon

(57) ABSTRACT

A portable moving picture recording device includes switching control to enable multiple data flow configurations. Two output encoders receive either composite or component digital video signals. The component video signals can come from one of three sources: decoded composite video, component video, and a random-access storage device. Inputs to a composite video analog-to-digital converter and a genlock decoder may be switched between at least two outputs, including a camera video and external video sources. The digital component signal may also be recorded onto the random access recording medium. These data paths are provided in a portable moving picture recording device, in combination with some editing capability.

15 Claims, 5 Drawing Sheets

U.S. PATENT DOCUMENTS

| | | | |
|---|---|---|---|
| 4,106,846 A | 8/1978 | Russin ........................ 358/10 |
| 4,139,903 A | 2/1979 | Morrill, Jr. et al. |
| 4,176,897 A | 12/1979 | Cameron ..................... 339/40 |
| 4,195,317 A | 3/1980 | Stratton ....................... 360/14 |
| 4,257,063 A | 3/1981 | Loughry ..................... 358/108 |
| 4,281,354 A | 7/1981 | Conte ............................ 360/5 |
| 4,285,483 A | 8/1981 | Cipollone |
| 4,295,154 A | 10/1981 | Hata .............................. 358/4 |
| 4,346,205 A | 8/1982 | Hiles ........................... 528/53 |
| 4,373,193 A | 2/1983 | Haag et al. |
| 4,378,572 A | 3/1983 | Hoffmann .................... 358/335 |
| 4,390,904 A | 6/1983 | Johnston ..................... 358/335 |
| 4,408,309 A | 10/1983 | Kiesling et al. |
| 4,409,670 A | 10/1983 | Herdon et al. |
| 4,480,317 A | 10/1984 | Haag et al. |
| 4,507,689 A | 3/1985 | Kozuki ....................... 360/33.1 |
| 4,516,678 A | 5/1985 | Fortiadis et al. .............. 206/44 |
| 4,523,226 A | 6/1985 | Lipton ......................... 358/88 |
| 4,538,188 A | 8/1985 | Barker ....................... 360/14.3 |
| 4,547,815 A | 10/1985 | Kimura ...................... 358/335 |
| 4,550,343 A | 10/1985 | Nakatani |
| 4,567,532 A | 1/1986 | Baer ........................... 358/342 |
| 4,568,133 A | 2/1986 | Amano et al. .............. 339/14.2 |
| 4,635,136 A | 1/1987 | Ciampa et al. ............. 358/342 |
| 4,642,682 A | 2/1987 | Orsburn ........................ 358/80 |
| 4,646,241 A | 2/1987 | Ratchford et al. |
| 4,654,848 A | 3/1987 | Noguchi |
| D289,290 S | 4/1987 | Enomoto et al. ............ D14/78 |
| 4,660,102 A | 4/1987 | Kawakami et al. ........ 360/14.1 |
| 4,675,755 A | 6/1987 | Baumeister et al. ....... 360/35.1 |
| 4,685,003 A | 8/1987 | Westland ................... 360/14.1 |
| 4,688,016 A | 8/1987 | Fok ............................. 340/347 |
| 4,689,683 A | 8/1987 | Efron ......................... 358/185 |
| 4,695,887 A | 9/1987 | Peterson ............... 358/213.13 |
| 4,695,888 A | 9/1987 | Peterson ............... 358/213.13 |
| 4,695,891 A | 9/1987 | Peterson ............... 358/213.13 |
| 4,695,905 A | 9/1987 | Utsugi ....................... 360/33.1 |
| 4,714,962 A | 12/1987 | Levine ...................... 358/209 |
| D293,784 S | 1/1988 | Miyashita et al. ........... D14/78 |
| 4,717,971 A | 1/1988 | Sawyer ...................... 358/342 |
| 4,746,990 A | 5/1988 | Katoh et al. ................ 358/310 |
| 4,752,834 A | 6/1988 | Koombes .................... 358/335 |
| 4,755,889 A | 7/1988 | Schwartz .................... 360/32 |
| 4,774,570 A | 9/1988 | Araki ......................... 358/108 |
| 4,777,537 A | 10/1988 | Ueno ......................... 358/341 |
| 4,792,864 A | 12/1988 | Watandabe ................. 358/335 |
| 4,816,901 A | 3/1989 | Music ......................... 358/13 |
| 4,819,101 A | 4/1989 | Lemelson .................. 360/10.1 |
| 4,823,285 A | 4/1989 | Blancato .................... 364/521 |
| 4,835,736 A | 5/1989 | Easterday |
| 4,841,503 A | 6/1989 | Yamada ....................... 369/14 |
| 4,847,677 A | 7/1989 | Music ......................... 358/13 |
| 4,855,813 A | 8/1989 | Russell ........................ 358/22 |
| 4,856,656 A | 8/1989 | Sugimoto et al. ........... 206/523 |
| 4,857,990 A | 8/1989 | Horgan ....................... 358/13 |
| 4,864,391 A | 9/1989 | Taguchi ....................... 358/80 |
| 4,864,429 A | 9/1989 | Eigeldinger ................ 358/349 |
| 4,872,054 A | 10/1989 | Gray .......................... 358/140 |
| 4,879,611 A | 11/1989 | Fukui ......................... 360/69 |
| 4,891,715 A | 1/1990 | Levy |
| 4,894,789 A | 1/1990 | Yee ............................ 364/521 |
| 4,897,741 A | 1/1990 | Inoue et al. |
| 4,901,161 A | 2/1990 | Giovanella ................. 358/346 |
| 4,918,523 A | 4/1990 | Simon ....................... 358/133 |
| 4,924,303 A | 5/1990 | Brandon .................... 358/86 |
| 4,926,291 A | 5/1990 | Sarraf ......................... 361/384 |
| 4,928,171 A | 5/1990 | Kline ......................... 358/97 |
| 4,935,816 A | 6/1990 | Faber ........................ 358/160 |
| 4,937,676 A | 6/1990 | Finelli et al. ............... 358/229 |
| 4,943,866 A | 7/1990 | Barker et al. |
| 4,963,995 A | 10/1990 | Lang .......................... 358/335 |
| 4,969,042 A | 11/1990 | Houtman .................... 358/160 |
| 4,970,663 A | 11/1990 | Bedell ....................... 345/439 |
| 4,982,290 A | 1/1991 | Nishi et al. ................. 358/310 |
| 4,982,390 A | 1/1991 | Tanaka |
| 5,010,499 A | 4/1991 | Yee ............................ 364/521 |
| 5,012,327 A | 4/1991 | Bishop ....................... 358/17 |
| 5,027,400 A | 6/1991 | Baji ............................ 380/20 |
| 5,038,319 A | 8/1991 | Carter et al. |
| 5,045,940 A | 9/1991 | Peters et al. ................ 358/143 |
| 5,056,056 A | 10/1991 | Gustin |
| 5,057,932 A | 10/1991 | Lang .......................... 358/335 |
| 5,067,130 A | 11/1991 | Jackson |
| 5,083,313 A | 1/1992 | Reinsch ........................ 382/8 |
| 5,084,775 A | 1/1992 | Kodama et al. ............ 358/335 |
| 5,099,322 A | 3/1992 | Gove ......................... 358/105 |
| 5,099,337 A | 3/1992 | Cury .......................... 358/335 |
| 5,103,301 A | 4/1992 | Cosentino .................. 358/42 |
| 5,115,311 A | 5/1992 | Jaqua ......................... 358/140 |
| 5,119,178 A | 6/1992 | Sakata et al. ................ 358/29 |
| 5,119,191 A | 6/1992 | Van den Heuvel ............ 358/97 |
| 5,121,440 A | 6/1992 | Ballard et al. .............. 382/220 |
| 5,121,470 A | 6/1992 | Trautman ................... 395/140 |
| 5,124,807 A | 6/1992 | Dunlap ....................... 358/316 |
| 5,126,851 A | 6/1992 | Yoshimura ................. 358/335 |
| 5,132,800 A | 7/1992 | Wada et al. ................. 358/209 |
| 5,133,079 A | 7/1992 | Ballantyne .................. 455/4.1 |
| 5,134,661 A | 7/1992 | Reinsch ........................ 382/1 |
| 5,138,459 A | 8/1992 | Roberts et al. ............. 358/209 |
| 5,140,414 A | 8/1992 | Mowry ....................... 358/81 |
| 5,144,461 A | 9/1992 | Horan ......................... 359/30 |
| 5,155,584 A | 10/1992 | Taguchi et al. ............. 358/41 |
| 5,157,512 A | 10/1992 | Inada et al. ................. 358/335 |
| 5,164,839 A | 11/1992 | Lang .......................... 358/335 |
| 5,168,363 A | 12/1992 | Kojima et al. |
| 5,173,779 A | 12/1992 | Lee ....................... 358/213.26 |
| 5,179,437 A | 1/1993 | Kawada et al. .............. 358/10 |
| 5,192,999 A | 3/1993 | Graczyk ..................... 358/85 |
| 5,211,566 A | 5/1993 | Bates et al. .................. 439/66 |
| 5,218,672 A | 6/1993 | Morgan et al. ............. 395/162 |
| 5,227,863 A | 7/1993 | Bilbrey ....................... 358/22 |
| 5,231,501 A | 7/1993 | Sakai ......................... 358/209 |
| 5,233,438 A | 8/1993 | Funahashi ................... 358/341 |
| 5,239,419 A | 8/1993 | Kim .......................... 360/14.1 |
| 5,241,389 A | 8/1993 | Bilbrey ....................... 358/181 |
| 5,241,428 A | 8/1993 | Goldwasser et al. |
| 5,253,078 A | 10/1993 | Balkanski ................... 358/426 |
| 5,262,877 A | 11/1993 | Otsuka ....................... 358/343 |
| 5,267,351 A | 11/1993 | Reber et al. ................ 395/600 |
| 5,270,831 A | 12/1993 | Parulski ...................... 358/403 |
| 5,274,758 A | 12/1993 | Beitel et al. ................ 395/154 |
| 5,282,092 A | 1/1994 | Wilhelms |
| 5,283,819 A | 2/1994 | Glick ........................... 379/90 |
| 5,301,026 A | 4/1994 | Lee ............................ 348/584 |
| 5,301,240 A | 4/1994 | Stockum et al. |
| 5,306,956 A | 4/1994 | Ikeda et al. ................. 307/125 |
| 5,307,456 A | 4/1994 | MacKay ..................... 395/154 |
| 5,309,528 A | 5/1994 | Rosen ......................... 382/58 |
| 5,325,202 A | 6/1994 | Washino ..................... 348/222 |
| 5,329,320 A | 7/1994 | Yifrach |
| 5,345,313 A | 9/1994 | Blank |
| 5,355,450 A | 10/1994 | Garmon et al. ............. 395/162 |
| 5,371,551 A | 12/1994 | Logan et al. |
| 5,372,515 A | 12/1994 | Miller et al. ................ 439/138 |
| 5,384,667 A | 1/1995 | Beckwith .................. 360/33.1 |
| 5,390,028 A | 2/1995 | Kobayashi .................. 358/346 |
| 5,408,383 A | 4/1995 | Nagasaka et al. ........... 361/707 |
| 5,424,755 A | 6/1995 | Lucas et al. ................ 345/155 |
| 5,431,161 A | 7/1995 | Ryals et al. |
| 5,434,678 A | 7/1995 | Abecassis ................... 358/342 |
| 5,450,140 A | 9/1995 | Washino ..................... 348/722 |

| | | | |
|---|---|---|---|
| 5,452,378 A | 9/1995 | Rosen | 382/312 |
| 5,471,666 A | 11/1995 | Sugiyama et al. | 348/231 |
| 5,477,264 A | 12/1995 | Sarbadhikari et al. | 348/231 |
| 5,479,205 A * | 12/1995 | Silverbrook | 358/906 |
| 5,483,285 A | 1/1996 | Lim et al. | 348/341 |
| 5,488,433 A * | 1/1996 | Washino et al. | 348/722 |
| 5,497,193 A | 3/1996 | Mitsuhashi et al. | 348/231 |
| 5,532,740 A | 7/1996 | Wakui | 348/231 |
| 5,533,193 A | 7/1996 | Roscoe | |
| 5,534,921 A | 7/1996 | Sawanobori | 348/333 |
| 5,537,157 A * | 7/1996 | Washino et al. | 348/722 |
| D373,778 S | 9/1996 | Fasciano et al. | |
| 5,568,275 A | 10/1996 | Norton et al. | 386/52 |
| 5,579,239 A * | 11/1996 | Freeman et al. | 348/14.01 |
| 5,633,837 A | 5/1997 | Gantt | |
| 5,636,360 A | 6/1997 | Courts et al. | |
| 5,661,823 A | 8/1997 | Yamauchi | |
| 5,701,383 A | 12/1997 | Russo et al. | |
| 5,715,018 A | 2/1998 | Fasciano et al. | |
| 5,724,605 A | 3/1998 | Wissner | |
| 5,771,330 A | 6/1998 | Takano et al. | |
| 5,802,361 A | 9/1998 | Wang et al. | |
| 5,842,170 A | 11/1998 | Daberko et al. | |
| 5,946,445 A | 8/1999 | Peters et al. | |
| 5,966,495 A * | 10/1999 | Takahashi et al. | 386/68 |
| 5,999,406 A | 12/1999 | McKain et al. | |
| 6,011,898 A | 1/2000 | Iwasaki et al. | |
| 6,035,367 A | 3/2000 | Laws | |
| 6,058,236 A | 5/2000 | Peters et al. | |
| 6,339,531 B1 | 1/2002 | McKain et al. | |
| 6,678,461 B1 | 1/2004 | Peters et al. | |
| 2003/0034997 A1 | 2/2003 | McKain et al. | |
| 2003/0194206 A1 | 10/2003 | Peters et al. | |
| 2003/0206715 A1 | 11/2003 | Peters et al. | |
| 2005/0053352 A1 | 3/2005 | McKain et al. | |

FOREIGN PATENT DOCUMENTS

| | | | |
|---|---|---|---|
| EP | 0560624 A2 | 6/1993 | H04N/5/262 |
| EP | 0617542 A2 | 9/1994 | H04N/1/21 |
| EP | 0618739 A2 | 10/1994 | H04N/9/80 |
| EP | 0645765 A1 | 3/1995 | G11B/7/00 |
| GB | 2242304 A | 9/1991 | G11B/33/14 |
| GB | 2286282 A | 9/1995 | |
| JP | 3-314435 | 6/1993 | |
| JP | 5-153448 * | 6/1993 | H04N/5/225 |
| WO | PCT/WO93-12481 | 6/1993 | G06F/5/06 |
| WO | PCT/WO93-21635 | 10/1993 | G11B/27/028 |
| WO | PCT/WO93/-24932 | 12/1993 | G11B/33/14 |
| WO | WO96/26600 A | 8/1996 | |
| WO | WO96/26601 | 8/1996 | |
| WO | WO96/26602 | 8/1996 | |

OTHER PUBLICATIONS

Gardner, Larry J. And David H. Scoggins, "A Closed–Loop Digital Video Editing System," Aug. 1990, pp. 634–638, SMPTF Journal.

* cited by examiner

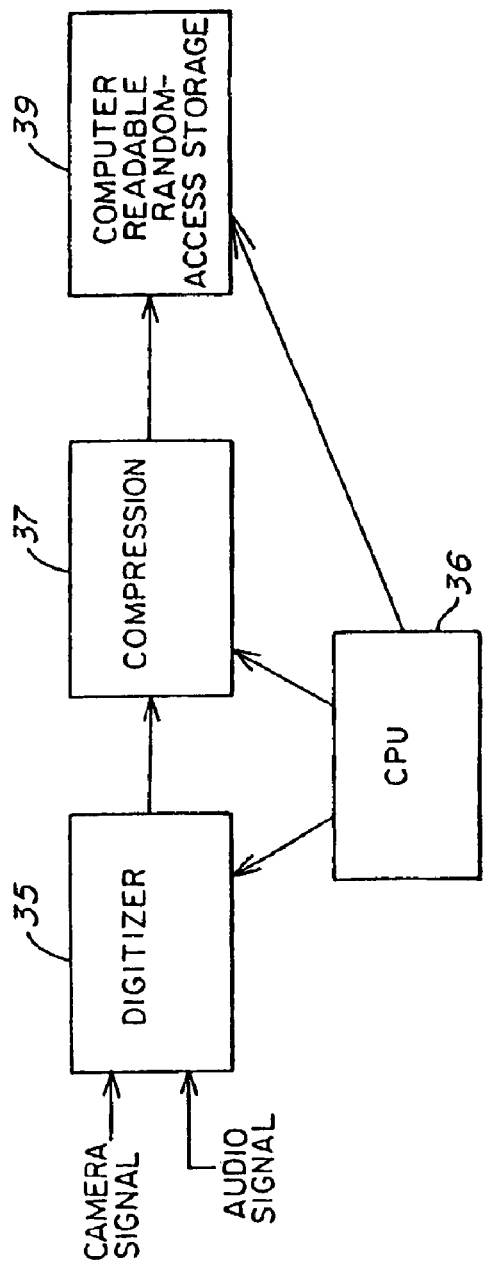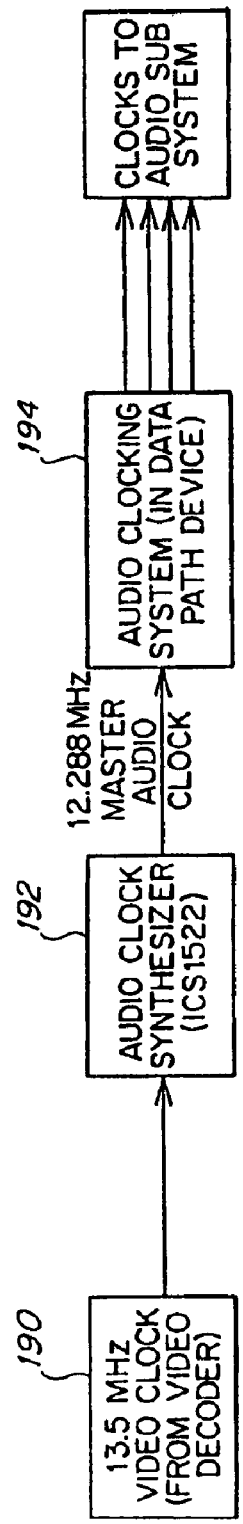

PORTABLE MOVING PICTURE RECORDING DEVICE INCLUDING SWITCHING CONTROL FOR MULTIPLE DATA FLOW CONFIGURATIONS

CROSS-REFERENCE TO RELATED APPLICATIONS

This application is a continuing application of: U.S. application Ser. No. 08/606,429, filed Feb. 23, 1996, now abandoned, which is a continuing application of U.S. application Ser. No. 08/418,186, filed Apr. 7, 1995, abandoned, which is a continuing application of U.S. application Ser. No. 08/392,536, filed Feb. 23, 1995, abandoned; and a continuation of U.S. application Ser. No. 08/816,068, filed Mar. 11, 1997, now abandoned, which is a file-wrapper continuation application of U.S. application Ser. No. 08/418, 186, filed Apr. 7, 1995, abandoned; and is a continuation of U.S. application Ser. No. 08/702,152, filed Aug. 23, 1996, now abandoned, which is a file-wrapper continuation application of U.S. application Ser. No. 08/392,536, filed Feb. 23, 1995, abandoned.

FIELD OF THE INVENTION

This invention relates to moving picture recording devices and processes. More particularly, the invention relates to controlling data flow using switches in a moving picture recording device to provide multiple functions in a portable recorder.

BACKGROUND OF THE INVENTION

Present day video recorders are typically a combination of a video camera with a video tape recorder which are constructed so as to be portable. They are often called camcorders or video tape recorders (VTR). For the purposes of this application, they are referred to as video tape recorders. Present day portable video tape recorders use a video tape, usually contained within a cassette, as the recording medium. Recording is done in numerous formats, including analog BETA and VHS format, and the digital D1 format. A major disadvantage of video tape recorders is that video tape allows only linear access to a given point on the video tape. That is, if the tape has just finished recording, in order to access the beginning of a recorded session located at the beginning of the tape, the tape must be rewound.

The problem of linear access to video tape recordings is most obvious in the field of broadcast television news. Typically, a reporting crew goes to a news location with a video tape recorder and record an event. Upon completion of recording, the tape is rewound and then played back and transmitted, for example via satellite or microwave link, to a base station a studio facility. At the base station, the information then can be edited into a final news program.

Editing of moving pictures is commonly done digitally, using a non-linear computer-based editing system such as the Avid/1 Media Composer or the NewsCutter, both available from Avid Technology, Inc. of Tewksbury, Mass. Such a system typically digitizes, or, converts analog video signals into a digital, computer-readable format. Even if the video signal is from a digital video tape, linear access to information on the tape still presents the same problems. Tape recording, transmission and digitization are usually performed unless there is an actual live connection from the camera to the base station. Because of the amount of time required for rewinding, playback and transmission of recorded information from a video tape, there is typically a half hour delay between the completion of recording of an event and the time an edited version of the recorded event actually can be broadcast by the base station. This delay is a significant competitive problem in broadcast news where the time to air is very important as stations strive to produce "up to the minute" news coverage and broadcast.

Today, electronic still cameras exist which record a still image on magnetic medium, such as a floppy disk. Such a camera is described in U.S. Pat. No. 5,084,775, issued Jan. 28, 1991, and assigned to Sony Corporation. However, the camera described in that patent records still images only, not full motion video images. In addition, computer video capture systems exist, such as the NuVista video capture card available from RasterOps/Truevision, Inc. Such systems, however, have not been combined with a video camera reduced to the portable form to perform live digital capture directly from a camera without intervening tape.

Additionally, it has been recently suggested by some skilled in the field of moving picture recording that numerous problems with a non-linear digital moving picture recorder are insurmountable. In particular, it has been suggested that there is a large image quality trade-off with increased recording time capability. Additionally, it has been suggested that, using disk-based media, a little shake of the camera would cause a disk crash. Finally, it has been suggested that the disk media is substantially costlier than tape.

Additionally, while still picture editing is available in some digital still video cameras, such as described in U.S. Pat. No. 5,301,026, such editing is significantly simpler than a full-motion video editing system and thus, such a still camera is not capable of recording or editing moving pictures.

Additionally, it is known that in many television stations there are a variety of switching capabilities to allow multiple sources of information to be fed to a single output channel. These sources are generally locked to and synchronized with the output channel frequency. Switching is performed between vertical time intervals, i.e., between frames, using a vertical time interval switch (VTIS). However, in a camera, there are typically only two sources of output, either live images or playback from tape, which are designed to be preselected by a user during playback but do not incorporate a VTIS.

SUMMARY OF THE INVENTION

The present invention combines editing capability typically found only in a production studio along with switching capabilities typically found only in a television station, in a portable moving picture recorder that records on computer-readable and writable random access recording media, such as a magnetic or optical disk. With such a combination, the capability and functionality of a full television broadcast news studio is provided on the shoulder of an individual in a portable camera.

One aspect of the invention is an electrical circuit which processes motion video and provides switching capability between a number of sources. In one embodiment, the circuit has an output switch which provides an output video signal selected from one of a received video signal or a video signal generated from digital video information stored on a recording medium. This embodiment may have two encoders for generating a video signal and a switch between their outputs, or a single encoder have a switch at its input. In another embodiment, the output video signal is selected from one of two received video sources, including a live camera. In another embodiment, two outputs are provided. Either or both of these outputs may include a switch to select one from any combination of one or more received sources and a recorded source. In another embodiment, the recording medium may be selected to record a selected received video signal.

In a particular embodiment of the invention, each of the received sources and the recorded video information directed through the electrical circuit on one or more pixel buses under flow control by a central processing unit. By having one pixel bus for received video data and a second pixel bus for recorded video data and outputs which select from one of the pixel buses, it is possible to view received data and recorded data simultaneously.

One aspect of the invention is a moving picture camera which provides an output video signal, typically an analog composite video signal, to a decoder. The decoder decodes the output video signal into a sequence of digital still images. The digital video information from the decoder is connected to an input of an encoder. The encoder generates a broadcast video signal output from the digital video information. This video signal from the camera is also applied to an analog-to-digital converter, of which a digital output is applied to a second decoder which generates component information. The output of this second decoder is applied to an input of the encoder. Additionally, the output of the second decoder is connected to a record and playback circuit, which records a digital video information stream onto a recording medium or plays back information from the recording medium. The record and playback circuit is also connected, in its playback mode, to the input of the encoder. A second encoder is also provided which has an input connected to the output of the record and playback circuit (in playback) and to the output of the two decoders. In an embodiment with a set of switches in the decoder to enable selection of an input signal source, the decoders can be connected to receive video information from either the camera or an external video source. Thus, the broadcast output encoder can either playback live information or previously recorded information. The second encoder can either playback information coming through the decoder or from the record and playback circuit.

An embodiment of the various aspects of the invention includes an editing system which allows a list of portions of the recorded media to be played. Using a random-access recording medium, real time playback of edited clips in an edited sequence is provided directly on the camera. Additionally, this playback list may include live sequences and thus provides on the camera a broadcast output that switches between live images and prerecorded clips which may have been edited. This allows a contiguous output video signal to be generated from these multiple sources within the camera.

More particularly, with the switching arrangement provided, multiple functions and combinations and sequences of these functions can be obtained. For example, while the camera is being played live on the air, material recorded on the disk may be previewed through the view finder, and/or edited. Live material may also be recorded. Additionally, external video may be previewed or recorded. While material recorded on the disk is being played back to air, it may be simultaneously viewed in the view finder or monitor. Additionally, live video from the camera or external video may also be directed to the view finder. While the camera is recording, either the camera or external video may be sent to live broadcast output. Additionally, when external video is being broadcast directly to air, material on the disk may be previewed and edited, video information from the camera may be previewed or recorded, and finally the external video information may also be recorded. Finally, the controller may be programmed to sequence among any of these modes.

In an embodiment providing an Ethernet or other computer-based communication connection, all of these functional capabilities can be provided under remote control.

In embodiments of the various aspects of the invention, a digital, computer-readable and writable random access recording medium, such as a magnetic or optical disk, is combined with a motion picture camera device. In one embodiment, by providing a smaller sized disk drive, e.g., 2½ inches in diameter, and shock and vibration isolation packaging, the risk of damage or disk failure is significantly reduced. Broadcast quality video is provided by a compressed stream of digital motion picture information at rates of four megabytes per second.

Another aspect of the invention, which is also useful in combination with the other various aspects of the invention, is a switching system for receiving, recording and playing back recorded audio data. Similar to the video switching, an output for each audio channel selects between one of received audio data and recorded audio data. It is also possible to output and record received audio data simultaneously, and simultaneously with video. An embodiment of the invention includes an editing system that allows for selection and editing of audio clips, as with the embodiment of the editing system for video clips. An audio channel may also include mixing capabilities.

In the various aspects of the invention, the recording medium may be a media data buffer and primary media storage, such as a disk drive. A processor controls data flow into and out of the media data buffer to and from any output. Video information may be stored on and read from the primary media storage using a form of demand-based flow control, since such digital video information does not require global synchronization. The video data written to and read from the primary storage into a media buffer is transferred to the outputs or from the inputs as the video data is needed. The video data may be stored as a data file according to an operating system executed by a central processing unit.

By providing a portable video recorder which records directly onto digital computer readable and writable random access (i.e., non-linear) medium, there is no longer a significant delay due to rewinding of the tape or for digitization of video tape for editing purposes. By further combining the advantages of non-linear recording and non-linear editing with non-linear broadcasting system and switching control, the time from videography to broadcast of an edited news event is drastically reduced. This reduction of the time from videography to broadcast provides a significant competitive advantage for broadcast news stations.

BRIEF DESCRIPTION OF THE DRAWINGS

In the drawings,

FIG. 3 is a block diagram of the electronic circuitry which processes the camera and audio signals into media files for storage on a computer readable and writable random access storage medium;

FIG. 7 illustrates synchronization circuitry for the audio and video paths.

DETAILED DESCRIPTION

The present invention will be more completely understood through the following detailed description which should be read in conjunction with the attached drawing in which similar reference numbers indicate similar structures.

Figure 1:
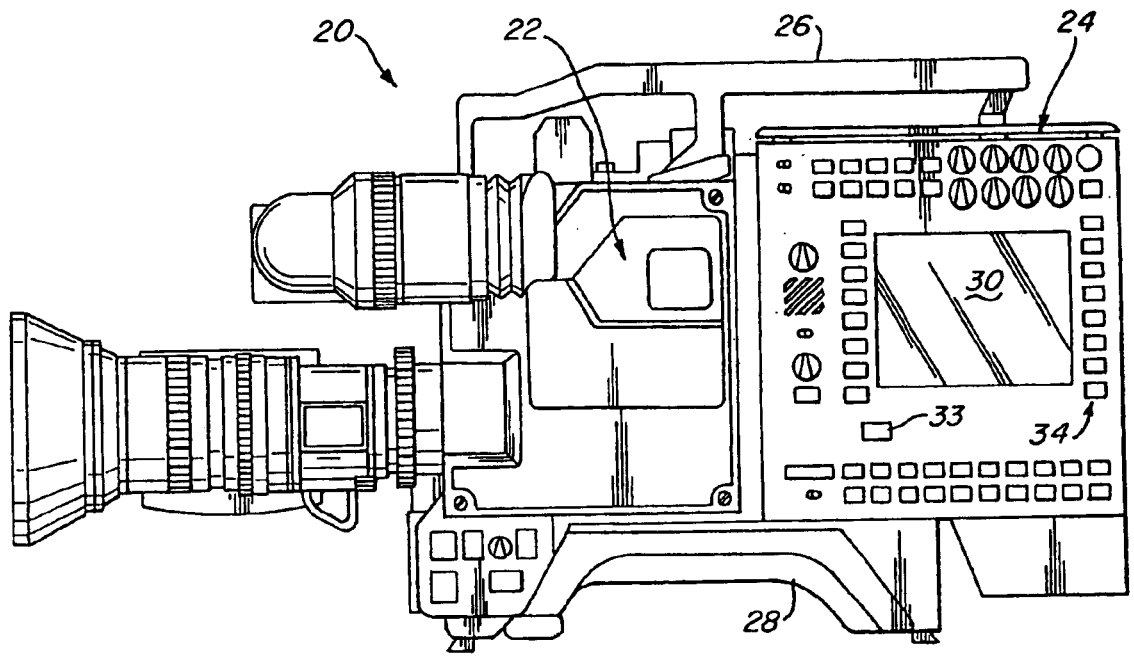
FIG. 1 is a left side view of a digital motion picture recorder affixed to a video camera in accordance with present invention.
Figure 2:
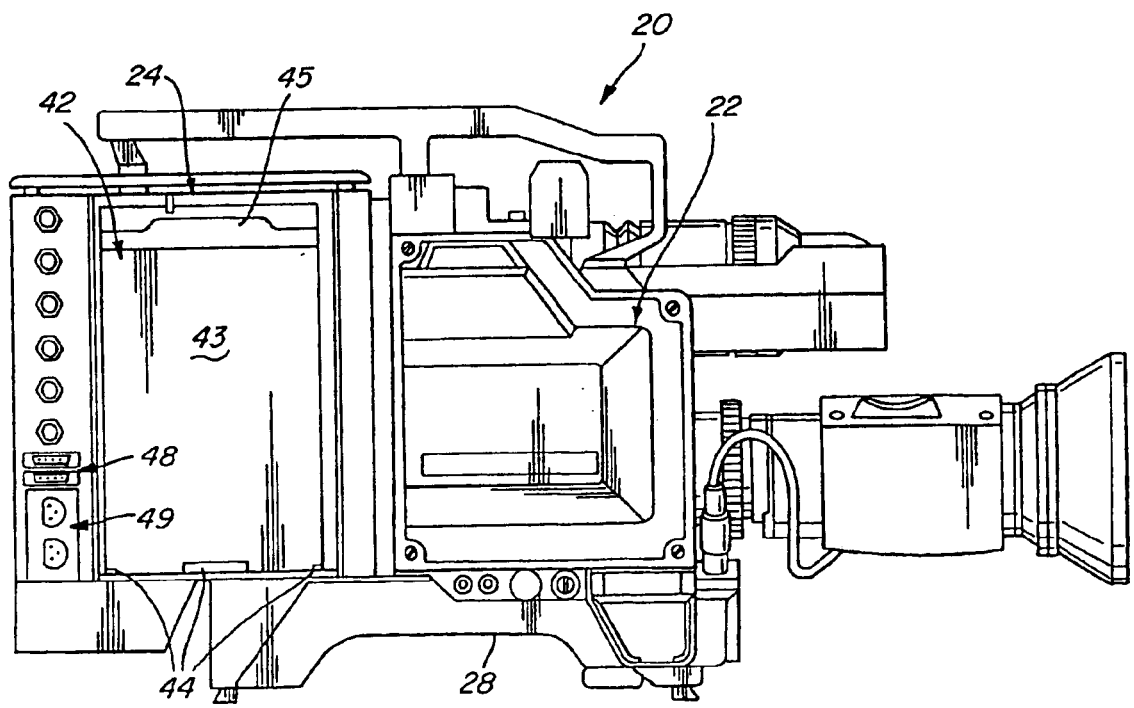
FIG. 2 is right side view of the digital motion picture recorder of FIG. 1.

A general description of the moving picture recording device is first provided in connection with FIGS. 1–3. Details concerning switching capabilities are described in more detail below in connection with FIGS. 4–7.

FIG. 1 shows a video camera/recorder 20 which includes a combination of a video camera 22 and a video recorder 24. The camera may be one of many types of video cameras, and may be, for example, either the HL-57 camera made by Ikegami Corporation of Japan, or the "400" camera made by the Sony Corporation of Japan. The video camera/recorder 20 also typically has a handle 26 and shoulder support 28. On the video recorder 24 of the device, typically a display 30 is used to provide the user status and other pertinent information to be detailed below. The camera, electronic circuitry (such as described below in connection with FIGS. 3–4) and recording medium may be in one piece, such that the camera 22 and recorder 24 are integrated, or may be in two pieces such that the camera 22 and recorder 24 are separable from each other. Many tape-based recorders used for news reporting are in such a two-part form, and often take the shape as shown in Japanese utility model 63-9907, also referred to as 56-134889, or Japanese patent 61-187165.

The output of the video camera is generally an analog video signal. Presently known cameras available from Ikegami have a 79-line bus for the purposes of communicating with a recorder, whereas Sony cameras use a 52-line bus. The recorder provides a physical and electrical connections to interface with a standard bus such as the Ikegami, Sony or other standard bus, so that the motion picture recorder receives the output of the camera as if the recorder were a videocassette recorder. The motion picture recorder also includes, using techniques well known to those skilled in the art, electrical contacts and connections (not shown) to turn the camera on and off, initiate recording, etc.

FIG. 2 shows the opposite side view of the camera shown in FIG. 1. On this side of the camera is found the recording media compartment 42 which is accessed via a door 43. External connections, such as 48 and 49, provide external video output, ETHERNET or other kinds of connections. The door 43 has a hinged section 44 and a handle 45 so that the door may be opened. The compartment 42 is an opening within the recorder and includes a connector (not shown) at the bottom of the compartment. Which receives a recording media package which connects to connector to provide electronic connection to the remainder of the circuitry of the recorder. The media package and connection to the recorder are described in more detail in U.S. patent application Ser. No. 08/392,536, filed Feb. 23, 1995 and U.S. patent application Ser. No. 08/418,631, filed Apr. 7, 1995 which are hereby incorporated by reference.

Having now described a general mechanical structure of an embodiment of the moving picture recorder, the electronic circuitry for processing the moving pictures will now be described. The output of the video camera 22, which is generally an analog signal, is provided to the digitizing electronic circuitry such as shown in FIGS. 3–9. Referring to FIG. 3, such circuitry generally includes a digitizer 35, compression circuitry 37, and a computer-readable and writable random-access recording medium 39, such as a disk drive, as described above. While the digitizer 35 is used for those video cameras which produce an analog signal, the digitizer would be unnecessary if the output of the video camera were to be digital. In some prior art systems, the image captured by the camera 22 of FIG. 1 is impressed upon a charge coupled device (CCD), well known to those skilled in the art. The CCD produces an electrical signal, which is then processed (either digitally or with analog circuitry) to create an analog video signal so that those signals may be passed to a conventional analog video cassette recorder. A digital video signal or a digital video information stream may be input directly to the compression circuitry 37 of FIG. 3, eliminating the digital-to-analog and analog-to-digital conversions associated with prior art devices from the circuitry within the camera 22.

However, to interface a recorder with presently existing analog output video cameras, the digitizer 35 is used. The digitizer may comprise a number of analog to digital (A/D) converters. These converters, well known to those skilled in the art, may accept the output of the analog video camera, and may comprise on A/D converter for each component Y, Cr and Cb signal from the video camera. Analog composite video may also be decoded into digital video data. Digital video may also be processed and synchronization signals may be removed to provide digital video information. A 4:2:2 format is typically used, but 4:1:1 and 4:4:4 formats may also be used. Other color formats may be used such as CMYK, HSI and RGB in 8, 16 or 32 bits formats. However, the Y, Cr, Cb format is preferable for use with the well known Joint Photographer's Expert Group (JPEG) compression standard, which may be used in this moving picture recorder. Other compression standards, well known in the art, such as MPEG, may also be suitable for use in the present invention. The video may also remain uncompressed. However, JPEG compression is useful for editing because it does not rely on differences between adjacent frames or fields, but instead each frame or field is self-contained. Digitizing and compression/decompression circuitry is described in U.S Pat. Nos. 5,355,450, 5,045,940 and published Patent Cooperation Treaty (PCT) applications WO93/12481 and WO93/12613.

Audio signals are also processed and recorded. The audio signal is digitized from a microphone. Digitization is unnecessary if a digital audio source is used. Audio is generally not compressed.

One difference between the systems described in the above patents and published applications and an embodiment of the present invention is that this embodiment of the present invention does not require a frame grabber or frame buffer. The frame buffer is eliminated to reduce power consumption, which is desirable with a portable, battery-powered system. Its removal is possible by using a high throughput compression circuit such as the ZR36050 and ZR36015 JPEG compression circuits, available from Zoran of Santa Clara, Calif. These circuits provide full 60 field per second uncompressed data rates for 720×480 digital still images, which provides CCIR601 compliant broadcast quality images. Due to the high throughput compression circuit, the compression circuitry of this embodiment does not require any stalling or metering mechanism for delaying processing of data through this pipeline. Other circuits are available for JPEG compression, such as from LSI Logic.

In order to maintain correct color of the captured images from the video camera, the signals from the camera may be calibrated to match well known and established SMPTE digital video color standards. In the absence of such calibration, the compression circuitry of the one embodiment of the invention, based on the well known and established JPEG compression standard, may create errors because JPEG compression relies on frequencies derived from the colors present in the signal. Calibration is done automatically in response to actuation of a calibration selection switch 33 on the video recorder of FIG. 1. Such calibration typically is performed both periodically during use and whenever a camera is associated with new calibration and digitizing circuitry.

Calibration is performed by causing the camera to generate a reference signal. A commonly-used reference signal is known as "color bars" or a "test pattern." The test pattern for any given camera is in a predetermined format and is typically generated by the camera circuitry in a known manner. Using this format, the overall signal level of the color bar signal is determined by the recorder, and thus the values output by the camera and, by inference, the CCD device are determined. These values are then mapped, using well known mapping techniques, to the SMPTE standard for digital color representations, of which an indication is stored in the recorder. More precisely, the A/D converters in the digitization process, described below, are adjusted so that the analog level output in the reference signal are translated to the corresponding SMPTE digital value. By creating this mapping in a deterministic way, the camera is thus forced into providing a SMPTE compliant digital video information. It is therefore no longer necessary to record a long clip of color bars as is common with video tape. It may, nonetheless, be preferable to store a single frame of color bars digitally in connection with each recorded clip of compressed video.

These components shown in FIG. 3 as well as overall camera and recorder control operate under the control of a central processing unit (CPU) 36, such as the MC68341, available from Motorola, Inc., which runs under control of a real-time operating system such as the VXWorks operating system available from Wind River Systems of Alameda, Calif.

Management of media files and the disk controller may be performed by any number of known techniques, including that disclosed in U.S. Pat. No. 5,267,351, assigned to Avid Technology and as disclosed in published PCT application WO 93/21636. Data files are in a DOS-compliant file format, such as the Real Time File System (RTFS) from etc bin systems of Groton, Mass. The RTFS file system is DOS compatible/re-entrant. This file system can be supplemented by a media file format known as the Open Media Framework (OMF), defined in the OMF Interchange Specifications available from Avid Technology and available in the OMF Interchange Toolkit, also available from Avid Technology.

Figure 4:
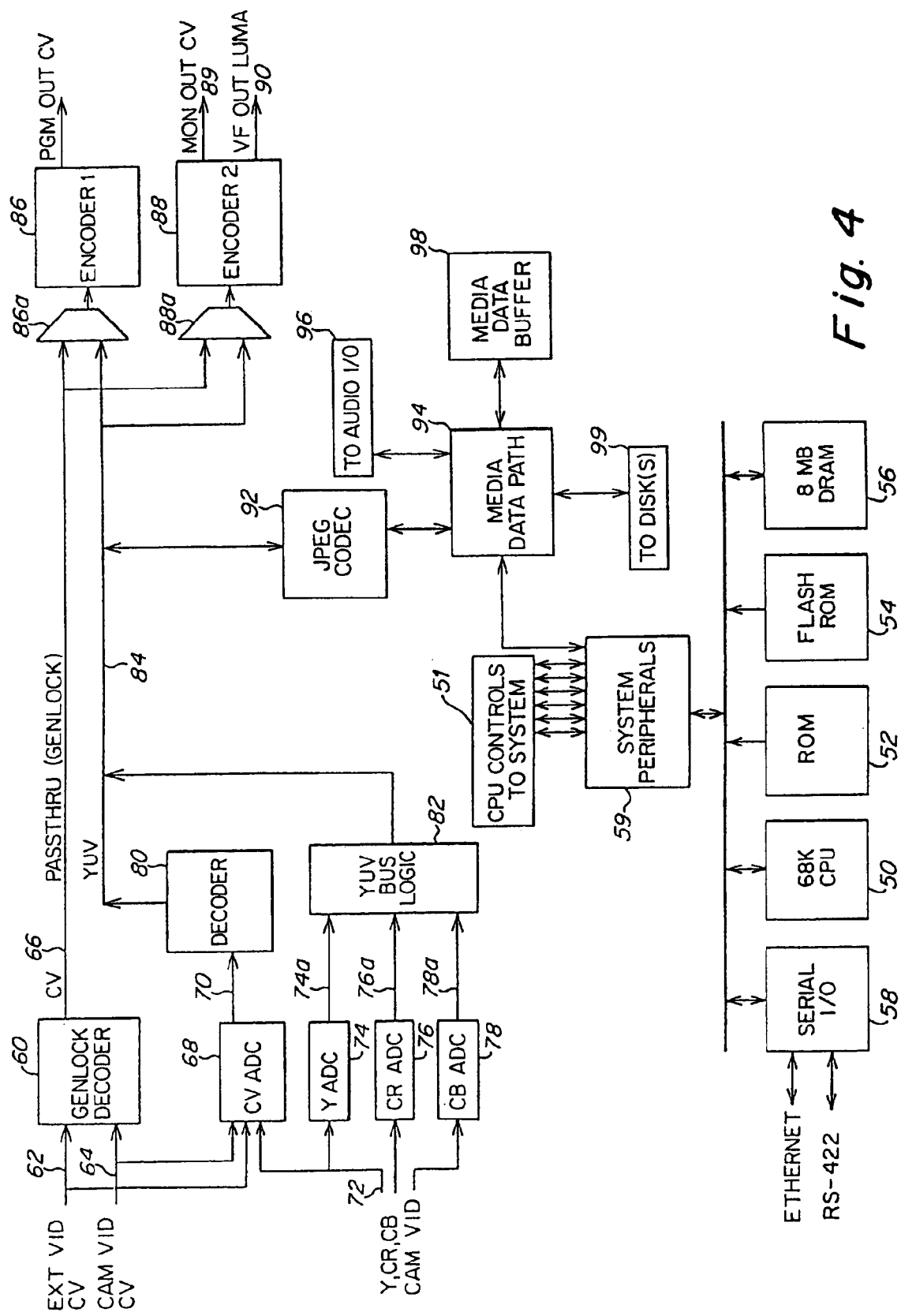
FIG. 4 is a more detailed block diagram of the block diagram of FIG. 3, illustrating switching paths.

FIG. 4 shows the circuitry of FIG. 3 in more detail. In particular, the circuit includes a genlock decoder 60 which receives a composite video signal either from an external video source on a first input 62 or from a camera video source through input 64 and outputs a digital composite video signal at 66. The external and camera composite video signals are also input to an analog-to-digital converter 68 to generate at an output 70 a digital composite video signal. Additionally, a component video signal, such as one comprised of luminance and chrominance components, is also received from a camera as an input as indicated at 72. The components are applied to analog-to-digital converters for each of the respective components as indicated in 74, 76 and 78. The output of these decoders, respectively, 74a, 76a and 78a provide a digital YUV digital component video information. A decoder 80 receives digital output from the composite video analog-to-digital converter 68 and generates a stream of digital video information, also in component form, typically YUV. The outputs of decoders 80 and component analog-to-digital converters 74–78 (via YUV bus logic 82) are both applied to what is herein called a pixel bus 84. The pixel bus 84 is used to transfer the YUV digital component information in this system. The composite video 66 and the YUV component information on pixel bus 84 are both applied to encoders 86 and 88 which provide output video signals. In particular, encoder 86 provides what is called a program out composite video signal, which is a broadcast quality CCIR 601 composite video signal. Encoder 88 provides an output composite video signal to a monitor as indicated at 89 and a luminance only output signal which is applied to a viewfinder, as described below. The composite video signal 66 and YUV digital video information on pixel bus 84 are illustrated as being applied to switches 86a and 88a which selectively apply one of the two inputs to their respective encoders 86 or 88. The switch is actually built into an integrated circuit which embodies the encoder, and hence the switches 86a and 88a are in FIG. 4 for illustration purposes only. They are not intended to signify multiplexers.

Also connected to the YUV pixel bus is a JPEG Codec 92. Although the described embodiment uses JPEG compression, it should be understood that other types of video compression may be used. However, it has been found that, with a commercially-available Codec, full-motion broadcast quality images can be provided. Additionally, because each field is compressed using JPEG independently of other fields in video stream, editing of video is not hindered by the compression algorithm. The JPEG Codec 92 receives input from and outputs to the pixel bus 84. The JPEG Codec is connected to a media data path controller 94. The media data path controller 94 also receives audio information from the audio subsystem as indicated at 96. The audio subsystem is described in more detail below.

The media data path controller 94 controls compressed data flow between JPEG Codec 92 and the media data buffer 98. Additionally, it controls compressed data flow between the media data buffer 98 and media storage, which is typically a computer readable and writable random access recording medium, such as a magnetic disk 99 or an optical disk. The entire system is controlled by a central processing unit 50. The control of the media data buffer 98 and CPU 50 is described, for example, in U.S. Pat. No. 5,045,940 and others as described above. The central processing unit has a bus 51 which connects it to a system peripheral controller 59 which provides control signals to the entire system. For example, it provides controls to the media data path 94, JPEG Codec 92, disk controllers for disk(s) 99, the YUV bus logic 92, decoder 80, the genlock decoder 60 and the encoders 86 and 88. It is also connected to a read only memory 52 which is used to store control programs in the operating system for the CPU. A flash ROM 54 also is provided in addition to some volatile memory such as dynamic random access memory as shown at 56. Finally, a serial I/O controller 58 may be used to provide either an ETHERNET or RS-422 connection to other computers or other equipment.

A more detailed block diagram of the circuitry shown in FIGS. 3 and 4 will now be described in connection with FIG. 5. As described above, the digitizing circuitry is controlled by a central processing unit 100, such as the Motorola MC68341 processor, running a real-time operating control system. The central processing unit 100 has a main address and data bus 102 to which other parts of the system are connected.

Digitizing circuitry includes a GENLOCK circuit 104, which processes composite video signals, and a set of analog-to-digital converters 106, associated with a synchronization signal stripping circuit 108, which processes component video signals into a YUV 4:2:2 format digital signal. The composite video signal output by the GENLOCK circuit 104 is provided to a decoder 110, which converts it into digital component information, similar to that output by the analog-to-digital converters 106. The horizontal synchronization signal (HSYNC), vertical synchronization signal (VSYNC), and the pixel clock (PIX) are used to synchronize the rest of the circuit. The composite signal is provided along a bus 109 to a decoder 110 which translates it into a YUV 4:2:2 digital component signal. The composite signal is also directed to encoder 162.

The component digital signals are applied to a pixel bus 112 which directs them through a switch 114, such as a multiplexer, to a raster block converter 116 and memory 118, which generates picture blocks from the serial pixel data for use and processing according to the JPEG compression standard described above. The memory 118 typically has a size of 32K×16. The transfer of pixel data to the raster block converter 116 bypasses the central processing unit (CPU) 100, i.e., pixel data is not written to the CPU's main memory 105. A JPEG processor 120 interacts with the raster block converter 116 and memory 118 to take a digital still image obtained from the pixel data and compresses it using the JPEG compression standard to provide an output as indicated at 122. The JPEG compression may be adaptive to provide improved image quality while maintaining good compression levels in accordance with the teachings of U.S. Pat. No. 5,355,450.

As to audio signals inputted, a microphone or line-in signal indicated at 130 is applied to one or more audio coders and decoders (CODEC) 132 which provide a serial digital output 134. The coders are not necessary if the input signal is digital, such as from a digital microphone, digital audio tape, compact disc or other digital source, or if the output signal is digital. The sampling rate may be any desired rate, but typical rates for audio include 44.1 KHz, 22 KHz and 48 KHz 8, 16 or 32-bit formats may be used, among others. It should be understood that the invention is not limited to any particular digital audio format Additionally, they may receive digital input via the bus 136 to convert them to analog output signals at 138. The serial audio data 134 and the compressed video data 122 are applied to a pipeline control circuit 124. The pipeline control circuit 124 is controlled using synchronization control information from a synchronization controller 126 to direct the data into a data buffer 128 typically implemented as a dynamic RAM. A suitable size for this buffer is 2 M×32 and it is typically implemented logically as a ring buffer. The pipeline control circuit is implemented in accordance with the teachings of U.S. Pat. No. 5,045,940 and PCT publication WO 93/12481. The CPU 100 controls synchronization controller 126, pipeline control circuit 124 and disk controllers 140 to direct the flow of the video and audio data between memory 128 and the disk storage 142. Two disk controllers are used for performing conventional striping. However, one controller may be used to send commands to circuitry on the drive package which may divide an incoming stream or combine an outgoing stream of data in response to commands from a single disk controller 100. Striping may be performed at the word level, or at block or byte levels. The disk controllers and associated bus to the disk may be any standard controller, such as IDE or SCSI controllers. It should be understood that the invention is not limited to the type of disk controller.

The pipeline controller provides a form of local synchronization using demand-based flow control of the media data between the encoders and decoders and the computer-readable storage. The movement of data on the pixel bus is through the compressed data buffer and to the storage is intermittent, but has an average flow that is comparable to the continuous, synchronized flow of a video signal. This flow control accommodates for statistical variations in flow due to disk accesses, memory management and other impact on the flow due to the other operating system activities. The flow control ensures that an encoder receives data when the data is needed and that data is read from a decoder without being dropped. An additional benefit of using flow-controlled media data is that no pre-roll time is needed to lock to an incoming source or to lock to an output frequency and phase.

This system may also be provided with the capability of providing an output video signal generated from the digitized video signal. For example, the pixel bus 112 may be connected to an overlay circuit 150. The output of the overlay circuit 150 and the composite signal on bus 109 may be provided to an encoder 152. The output of the encoder may be provided back to the camera which has an input for the view finder 154. Additionally, this signal may be provided to monitor output 156. In one embodiment of the invention, the camera's view finder 154 receives a signal not only from the camera, but also from an alternate source. Using this capability, the moving picture recorder may have a controller 158 and an associated memory 160 which may provide additional status information via the view finder in connection with the video being recorded. Such status information may be an indication of battery level, time codes, time of day, function performed (e.g., recording or playback), etc.

The central processing unit 100 also has associated with it a programmable read-only memory, such as a flash memory 101 in which program information is stored and a dynamic RAM controller 103 and dynamic RAM 105, which are common in the art, for storing volatile data while processing. Typically the memory 101 contains an operating system and other programming code which is kept in non-volatile storage. A suitable size for this memory 101 is 4M. A suitable DRAM size is 4 M×16.

The moving picture recorder may include an additional encoder 162 which provides a composite-out video signal with VITC/LTC control information. The input to the encoder may be any one of the pixel bus 112, the output of decoder 110, bypassing pixel bus 112, the output of A/D converters 106, bypassing pixel bus 112, or the output of genlock circuit 104 on bus 109. Alternatively, each of these inputs may be applied to its own separate encoder. The outputs of these encoders may be fed to a simple switch allowing for the selection of one of these outputs. Additionally, an ETHERNET connection 164 may also be provided.

In one embodiment of the invention, two pixels buses 112 may be used. The first bus is the record bus which connects to the outputs of the decoders 110 and 106, and to the inputs of the JPEG compression circuitry, via the input side of switch 114, and the encoders 162 and 152. The second bus is the playback bus which connects to the output of the JPEG decompression circuitry, via the output side of switch 114, and the inputs of encoders 162 and 152.

In one embodiment of this invention, the GENLOCK circuit 104 may be a Raytheon 22071 GENLOCK circuit. The decoder 110 may be a Raytheon SAA7151 decoder. The encoders 152 and 162 may also be either a Raytheon or TRW 22191 full video encoder. The ETHERNET circuit, audio modules and disk controller are available in a variety of forms and are available from a number of suppliers.

Figure 5:
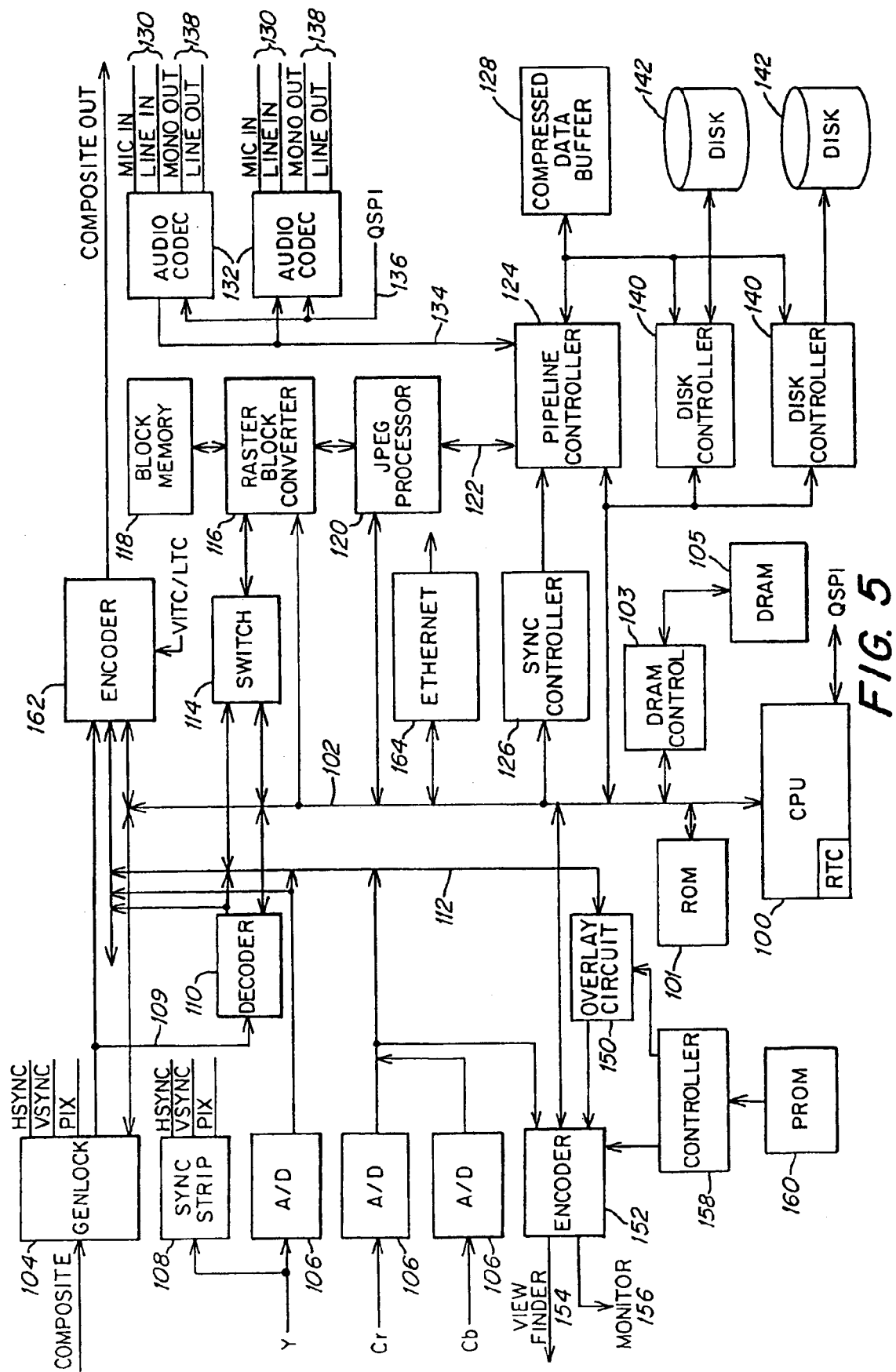
FIG. 5 is a more detailed block diagram of the circuit illustrated in FIG. 4.
Figure 6:
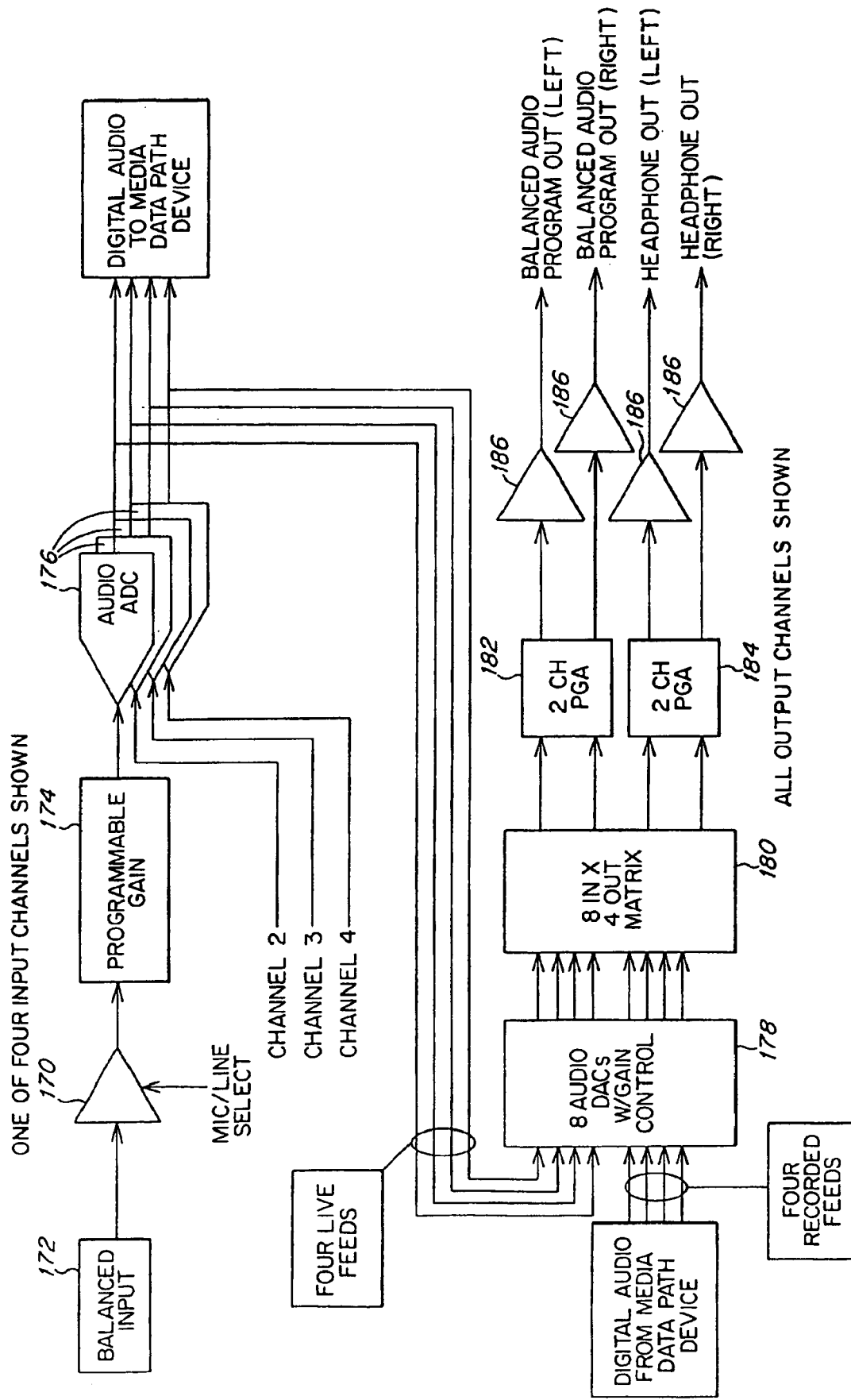
FIG. 6 illustrates audio signal paths.

FIG. 6 describes in more detail the audio subsystem, such as shown at the audio Codecs 132 in FIG. 5. There are generally four input channels and four output channels: left and right microphone inputs and left and right line inputs, and left and right balanced audio program out and left and right headphone out. Each audio channel is provided with a selector 170 which selects between microphone and line level inputs, according to the input 172 (which can be balanced) that it expects to receive. A programmable gain amplifier 174 is also provided on each channel. Each audio channel also has a corresponding audio analog-to-digital converter 176 which receives the audio input signal and converts it to a digital signal. The outputs of the analog-to-digital converters 176 are digital audio which are applied to the media data path device, such as indicate as the pipeline controller 124 or media data path device 94 in FIG. 4. These digital signals are then fed to digital-to-analog converters with gain control as indicated at 178. Digital-to-analog converters 178 receive eight inputs: the digital signals from the digital audio from the media path device (four recorded feeds) and the digital outputs of the analog-to-digital converters 176 (four live feeds). Digital-to-analog converters 178 provide eight outputs to an 8-in by 4-out matrix 180 which selects from the 8-input and provides the 4 audio outputs. These four audio outputs are fed to, in pairs, a two-channel programmable gain amplifier 182, 184. These are then fed to a microphone or line select device 186 to in turn provide either balanced audio program-out or headphone-out. In one embodiment, the analog-to-digital and digital-to-analog converters are implemented with a Crystal Semiconductor 4225 coder/decoder. The 8-4 switching matrix is an analog switch such as a MAX 335 available from MAXIM.

It is also possible to provide a warring tone generating circuit that can be selectively applied to either the program-out or headphone circuitry. Additionally, a speaker on the camera may be connected to play the program-out audio.

Control of the amplifiers and switches is provided by computer programming in a control program on the CPU. This communication is done over what is indicated as a QSPI bus in FIG. 5. In particular, for the variety of possible modes of the system, the computer has corresponding output signals which are set when a given mode is selected by the camera user.

Synchronization of the playback of video and audio through the program-out channels will now be described in FIG. 7. The synchronization is performed by creating a video clock from a video decoder, such as a 13.5 MHz clock as indicated at 190. An audio clock synthesizer, such as a Crystal Semiconductor CS1522 audio clock synthesizer, as indicated at 192, receives the video clock from the video decoder and generates a master audio clock, such as a 12.288 MHz clock. This master audio clock is then provided to an audio clocking system 194 in the media data path device which generates a plurality of clocks to the audio subsystem.

The display 30 shown in FIG. 1 provides further advantages over the prior art. In prior art recorders, the linear recorder performs the function of recording and perhaps playback of the material recorded on the single videocassette in the system. Editing of the material must be delayed until the videocassette is mounted in an analog video editor, or, more recently, a non-linear video editor after the video material has been digitized. One aspect of the present invention provides a digitized, compressed-form material which may be readily edited. In one embodiment of the invention, the recorder includes an editing system, such as the editing system described in U.S. Pat. No. 5,267,351 and PCT published application WO93/21636, the disclosure of which is incorporated by reference herein. The editing system is also described in U.S. patent application Ser. No. 08/418,948, filed Apr. 7, 1995 and incorporated by reference herein. The inclusion of the editing system allows a user to edit the video material recorded at the recording site, even prior to, or in lieu of, editing in a studio. This is particularly advantageous if the material must be broadcast immediately. Therefore, the video and audio signals may be recorded, edited and broadcast from the field in a very short period of time. During editing, information is played back through the digital video pipeline through either the view finder or other display. During editing it is possible to display video through an external video port, or to have the external video port transmit live video. The arrangement of a variety of video inputs and outputs provides switching capabilities in the camera similar to those found in a television broadcast studio.

The recorder 20 in FIG. 1 also may include a number of pressure sensitive or other suitable controls 34 to provide recording and edit function for the material displayed on display 30. The display 30 may be of a LCD or other suitable thin panel type.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art.

For example, analog-to-digital conversion circuitry may be eliminated from the camera because processing of analog signals is no longer necessary.

Additionally, although a media package is described herein as removable, it need not be removable. Additionally, disk drives may be external to the camera, for example, in a rack mount. Rather than record to disk, an output may be directed to a computer network, such as an ATM network, or a transmitter, such as a cellular, satellite, or microwave or phone link. By providing removable disk drives, a disk drive becomes filled with recorded video material, a new, empty disk drive can be inserted to replace the filled drive, similar to replacement of a video tape. It is also possible to have two hard disk drive packs, and thus two receptacles in the video recorder 24 of the type shown in FIGS. 3 and 4. With such a system, continuous recording from one disk drive to the next can enable an indefinite amount of time to be recorded without loss of information due to switching of recording media These and other modifications are contemplated as falling within the scope of the invention as defined by the appended claims.

What is claimed is:

1. A digital motion picture recorder, comprising:

a housing sized to be portable for use by an individual;

a camera mounted in the housing having an output for providing a full motion video signal;

a decoder, mounted in the housing, for receiving the full motion video signal from the camera and for converting the full motion video signal into a sequence of digital still images;

a digital, computer-readable and writeable random-access medium mounted in the housing, and connected to receive and store the sequence of digital still images from the decoder in a computer-readable file format and to provide digital still images stored thereon;

means, in the housing, for enabling the individual to capture digital still images from the decoder into a plurality of data files on the digital, computer-readable and writeable random-access medium, wherein each of the plurality of data files stores a sequence of digital still images;

an encoder mounted in the housing and having an input for receiving a sequence of digital still images, for generating as an output a full motion video signal;

a switch mounted in the housing and having a first input for receiving digital still images from the decoder and a second input for receiving digital still images from the digital, computer-readable and writeable random-access medium, and an output connected to the input of the encoder;

an interface on the housing for causing the switch to provide one of the first and second inputs as the sequence of digital still images to the input of the encoder;

means, in the housing, for enabling the individual to specify a sequence of segments of the plurality of data files stored on the digital, computer-readable and writeable random-access medium; and means, in the housing, for enabling the individual to initiate playback of full motion video through the switch and the encoder using the digital still images from the plurality of data files stored on the digital, computer-readable and writeable random-access medium according to the specified sequence of segments of the plurality of data files.

2. A digital video recording device, comprising:

a portable housing;

a camera mounted in the portable housing having an output providing a video signal;

a decoder mounted in the portable housing having an input connected to the output of the camera and an output providing digital video information as a sequence of digital still images;

a random-access, computer-readable and writeable medium mounted in the portable housing and for storing digital video information from the decoder as a sequence of digital still images in a computer-readable file format and for providing digital video information stored thereon;

means, in the portable housing, for enabling a user to capture sequences of digital still images from the decoder into a plurality of data files on the random-access, computer-readable and writeable medium, wherein each of the plurality of data files stores a sequence of digital still images;

an encoder mounted in the portable housing and having an input for receiving a sequence of digital still images and having an output for providing an output video signal from the received sequence of digital still images;

a switch mounted in the portable housing having a first input for receiving the sequence of digital still images from the decoder and a second input for receiving the sequence of digital 1still images from the random-access, computer-readable and writeable medium, and an output connected to provide one of the received sequences of digital still images to the input of the encoder;

an interface on the portable housing for causing the switch to provide one of the first and second inputs to the input of the encoder; and means, in the portable housing, for enabling the user to specify a sequence of segments of the plurality of data files stored on the random-access, computer-readable and writeable medium; and means, in the portable housing, for enabling the user to initiate playback of full motion video by the encoder by providing the digital still images from the plurality of data files stored on the random-access, computer-readable and writeable medium through the switch according to the specified sequence of segments of the plurality of data files.

3. A digital video recording device, comprising:

a portable housing;

a camera mounted in the portable housing having an output for providing a full motion video signal;

a digital, computer-readable and writeable random access medium mounted in the portable housing;

means, in the portable housing, for enabling a user to capture digital video information corresponding to the full motion video signal into a plurality of data files in a computer readable file format on the digital, computer-readable and writeable random-access medium;

an encoder mounted in the portable housing and having a first input for receiving digital video information from files stored on the digital computer-readable and writeable random-access medium, a second input for receiving digital video information corresponding to the full motion video signal from the camera and an output providing a video signal according to the first or second input;

means in the portable housing for causing the encoder to select between the first and second inputs; and means in the portable housing for enabling the user to specify a sequence of segments of the plurality of data files stored on the digital, computer-readable and writeable random-access medium; and means in the portable housing for enabling the user to initiate playback of full motion video by the encoder by providing the digital video information from the plurality of data files stored on the digital, computer-readable and writeable random-access medium to the first input of the encoder according to the specified sequence of segments of the plurality of data files.

4. A digital video recording device, comprising, in a portable housing:

a camera for providing a full motion video signal;

means for storing data;

means for enabling a user to capture digital video information corresponding to the full motion video signal into a plurality of data files in a computer readable file format on the means for storing;

an encoder having a first input for receiving stored digital video information from the means for storing and a second input for receiving digital video information corresponding to the full motion video signal, and an output for providing a video signal according to either the first or second input;

means for causing the encoder to select between the first and second inputs; and means for enabling the user to specify a sequence of segments of the plurality of data files stored on the means for storing; and means for enabling the user to initiate playback of full motion video by the encoder by providing the digital video information from the plurality of files stored on the means for storing to the first input of the encoder according to the specified sequence of segments of the plurality of data files.

5. The digital video recording device of claim 4, further comprising:

means for selectively operating the means for storing to store digital video information corresponding to the received full motion video signal as digital video information or to direct stored digital video information to the first input of the encoder.

6. The digital video recording device of claim 4, further comprising:

a second encoder having a first input connected to receive stored digital video information from the means for storing and a second input connected to receive digital video information corresponding to the received full motion video signal, and an output for providing an output video signal according to a selected one of the first and second inputs; and means for causing the second encoder to select from one of the first and second inputs.

7. The digital video recording device of claim 4, further comprising:

means for receiving and for storing on the means for storing digital audio information in a plurality of data files;

an audio encoder having a first input connected to receive input audio information and a second input to receive stored digital audio information from the means for storing, and an output providing an output audio signal according to a selected one of the first and second inputs; and means for causing the audio encoder to select from one of the first and second inputs.

8. The digital video recording device of claim 4, further comprising:

a first bus connecting the camera to the first input of the encoder; and a second bus connecting the means for storing to the second input of the encoder.

9. The digital motion video recorder according to claim 1, further comprising:

a media data buffer for receiving a sequence of digital still images from the decoder and for providing the received sequence of digital still images to the digital, computer-readable and writeable random-access medium; and a processor for controlling data flow between the media data buffer and the digital, computer-readable and writeable random-access medium.

10. The digital motion video recorder according to claim 1, further comprising:

a first pixel bus for transmitting a sequence of digital still images from the decoder; and a second pixel bus for transmitting a sequence of digital still images from the digital, computer-readable and writeable random-access medium, wherein the first pixel bus is connected to the first input of the switch and the second pixel bus is connected to the second input of the switch.

11. The digital motion video recorder according to claim 1, wherein the digital, computer-readable and writeable random-access medium is a disk drive having a capacity to store several minutes of sequences of digital still images.

12. The digital motion video recorder according to claim 1, further comprising means for storing digital audio information in a plurality of data files on the digital, computer-readable and writeable random-access medium, and for playing back the digital audio information in synchronization with the full motion video signal output by the encoder.

13. A digital video recording device, comprising:

a portable housing;

a camera attached to the portable housing and having an output providing live digital video information;

a display mounted on the portable housing;

a random access, computer-readable and writeable medium mounted within the portable housing;

means, in the portable housing, for enabling a user to capture digital video information from the camera into a plurality of data files in a computer readable file format on the random access, computer-readable and writeable medium;

a first encoder mounted within the portable housing having an input for receiving digital video information and an output for providing output video information;

a second encoder mounted within the portable housing having an input for receiving digital video information and an output for providing an output video signal to the display;

a first switch mounted within the portable housing and having a first input for receiving live digital video information from the camera and a second input for receiving recorded digital video information from the random access computer-readable and writeable medium, and an output connected to provide the digital video information to the input of the first encoder;

a second switch mounted within the portable housing and having a first input for receiving live digital video information from the camera and a second input for receiving recorded digital video information from the random access computer-readable and writeable medium, and an output connected to provide the digital video information to the input of the second encoder;

means for enabling the user to specify a sequence of segments of the plurality of data files stored on the random access, computer-readable and writeable medium;

means for enabling the user to initiate playback of full motion video by the first encoder by providing the digital video information from the plurality of files stored on the random access, computer readable and writeable medium through the first switch according to the specified sequence of segments of the plurality of data files, including means for controlling the first switch; and means for enabling the user to initiate playback of full motion video by the second encoder by providing the digital video information from the plurality of files stored on the random access, computer readable and writeable medium through the second switch, according to the specified sequence of segments of the plurality of data files, including means for controlling the second switch.

14. The digital video recording device of claim 13, further comprising:

means for setting the first switch to allow playback of full motion video from the camera by the first encoder during playback by the second encoder of the sequence of segments from the plurality of data files.

15. A digital video recording device, comprising:

a portable housing;

a camera mounted in the portable housing having an output for providing a full motion video signal;

a digital, computer-readable and writeable random access medium mounted in the portable housing;

means, in the portable housing, for enabling a user to capture digital video information corresponding to the full motion video signal into a plurality of data files in a computer readable file format on the digital, computer-readable and writeable random-access medium;

an encoder mounted in the portable housing and having a first input for receiving digital video information from files stored on the digital computer-readable and writeable random-access medium, a second input for receiving digital video information corresponding to the full motion video signal from the camera and an output providing a video signal according to the first or second input;

means in the portable housing for causing the encoder to select between the first and second inputs; and means in the portable housing for enabling the user to specify a list of portions of the plurality of data files stored on the digital, computer-readable and writeable random-access medium; and means in the portable housing for enabling the user to initiate playback of full motion video by the encoder as a contiguous output signal by providing the digital video information from the plurality of data files stored on the digital, computer-readable and writeable random-access medium to the first input of the encoder according to the specified list of portions of the plurality of data files.

* * * * *